(12) United States Patent
Zhou

(10) Patent No.: US 9,547,120 B2
(45) Date of Patent: Jan. 17, 2017

(54) LIQUID CRYSTAL DISPLAY DEVICE AND CURVED BACKLIGHT ASSEMBLY THEREOF

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 397 days.

(21) Appl. No.: 14/372,751

(22) PCT Filed: Jul. 4, 2014

(86) PCT No.: PCT/CN2014/081649
§ 371 (c)(1),
(2) Date: Jul. 17, 2014

(87) PCT Pub. No.: WO2016/000256
PCT Pub. Date: Jan. 7, 2016

(65) Prior Publication Data
US 2016/0274294 A1  Sep. 22, 2016

(30) Foreign Application Priority Data

Jul. 2, 2014 (CN) .......................... 2014 1 0314603

(51) Int. Cl.
*G02B 6/36* (2006.01)
*F21V 8/00* (2006.01)
*G02F 1/1335* (2006.01)

(52) U.S. Cl.
CPC ........... *G02B 6/0085* (2013.01); *G02B 6/0088* (2013.01); *G02B 6/0091* (2013.01); *G02B 6/0045* (2013.01); *G02F 1/133608* (2013.01)

(58) Field of Classification Search
CPC ... G02B 6/0011; G02B 6/0045; G02B 6/0046; G02B 6/0081; G02F 1/133615
(Continued)

(56) References Cited

U.S. PATENT DOCUMENTS 8,905,618 B2 * 12/2014 Kuo ................... G02F 1/133608
362/632
2004/0240195 A1 * 12/2004 Tsai ..................... G02B 6/0086
362/633
(Continued)

FOREIGN PATENT DOCUMENTS

CN       101943350 A     1/2011
CN       201827834 U     5/2011
(Continued)

*Primary Examiner* — Julie Bannan
(74) *Attorney, Agent, or Firm* — Andrew C. Cheng

(57) ABSTRACT

A curved backlight assembly includes a light source, a curved light guide plate (LGP), a heat-dissipating plate, a supporting plate and a connecting member. The light source is abutted with the curved LGP. The heat-dissipating plate and supporting plate are connected by the connecting member to thereby form a curved backplane. The curved LGP is arranged on the curved backplane. Connected ends of the heat-dissipating plate and supporting plate are formed with elongated slots. The connecting member penetrates through elongated slots to connect the heat-dissipating plate and the supporting plate. A dimension of the curved backplane is increased or decreased with a relative displacement between the heat-dissipating plate and supporting plate to match with expansion or contraction of the curved LGP. The present invention has a simple structure. An optical coupling distance between the light source and curved LGP is shortened and the light incidence efficiency is improved.

16 Claims, 3 Drawing Sheets

(58) Field of Classification Search
USPC .................................................. 362/632, 633
See application file for complete search history.

(56) References Cited

U.S. PATENT DOCUMENTS

| | | | |
|---|---|---|---|
| 2007/0146569 A1* | 6/2007 | Nouchi | G02B 6/0088 349/58 |
| 2008/0007963 A1* | 1/2008 | Hsieh | G02B 6/0085 362/600 |
| 2009/0002601 A1 | 1/2009 | Lee | |
| 2010/0271845 A1* | 10/2010 | Chiu | G02B 6/0081 362/633 |
| 2011/0096262 A1* | 4/2011 | Kikuchi | G09F 9/301 349/58 |
| 2013/0063680 A1* | 3/2013 | Zhou | G09F 13/04 349/62 |
| 2013/0155652 A1* | 6/2013 | Zhang | G09F 13/04 362/97.1 |
| 2013/0215356 A1* | 8/2013 | Yu | G02B 6/0088 349/58 |
| 2013/0250608 A1 | 9/2013 | Chen | |
| 2015/0160407 A1* | 6/2015 | Hsiao | G02F 1/133308 349/65 |
| 2016/0109647 A1* | 4/2016 | Hsiao | G02F 1/133308 349/58 |

FOREIGN PATENT DOCUMENTS

| | | |
|---|---|---|
| CN | 102313210 A | 1/2012 |
| CN | 103823321 A | 5/2014 |
| WO | WO2012008239 A1 | 1/2012 |

* cited by examiner

LIQUID CRYSTAL DISPLAY DEVICE AND CURVED BACKLIGHT ASSEMBLY THEREOF

TECHNICAL FIELD

The present invention relates to the field of liquid crystal display, and particularly to a curved backlight assembly and a liquid crystal display device using such curved backlight assembly.

DESCRIPTION OF RELATED ART

A conventional backlight module based structure generally includes a backplane, a reflective sheet, a light guide plate, an optical film, a light emitting unit, a plastic frame, a liquid crystal panel and a front frame, etc. In order to reduce the cost, the backplane of the backlight module are formed by splicing two pieces of plates with different materials by a simple and reliable method, and thereby a spliced backplane of composite material is obtained. Currently, with the emergence of curved TV, the backplane of the backlight module of liquid crystal display device also is made to be curved.

The material of light guide plate generally is a high molecular material such as polymethylmethacrylate (PMMA), polycarbonate (PC), etc., but such material is prone to expand when heated. The light source when is working will generate a lot of heat, since the light guide plate is arranged near to the light source, the light guide plate would occur a relatively large degree of expansion. Accordingly, in the design of backlight module, an adequate expansion gap needs to be left for the light guide plate. However, the optical coupling distance between the light source and the light guide plate would be large correspondingly, resulting in decreased light incidence efficiency.

SUMMARY

Accordingly, the present invention provides a liquid crystal display device and a backlight assembly thereof, so as to solve the problems of excessively large optical coupling distance between the light source and the light guide plate and decreased light incidence efficiency.

In order to solve above-mentioned technical problems, a technical solution proposed by the present invention is to provide a curved backlight assembly. In particular, the curved backlight assembly includes a light source, a curved light guide plate, a heat-dissipating plate with a preset curvature radius, a supporting plate with a preset curvature radius, and a connecting member. The light source is abutted with the curved light guide plate. The heat-dissipating plate and the supporting plate are connected by the connecting member to thereby form a curved backplane. The curved light guide plate is arranged on the curved backplane. Connected ends of the heat-dissipating plate and the supporting plate are formed with elongated slots. The connecting member penetrates through the elongated slots to connect the heat-dissipating plate and the supporting plate together. A dimension of the curved backplane is increased or decreased with a relative displacement between the heat-dissipating plate and the supporting plate to match with expansion or contraction of the curved light guide plate.

In an exemplary embodiment, the heat-dissipating plate and the supporting plate define a spacing cavity at a connection location thereof. The spacing cavity is for facilitating the connecting member to penetrate through the elongate slots of the heat-dissipating plate and the supporting plate and for heat dissipating of the curved light guide plate.

In an exemplary embodiment, the connecting member includes a connecting rod, a flexible member and a connecting cap. The flexible member is engaged with the connecting rod and arranged at an outer surface of the elongated slot of the heat-dissipating plate facing toward the curved light guide plate. The connecting cap is engaged with the connecting rod and arranged on an outer surface of the elongated slot of the supporting plate facing away from the curved light guide plate.

In an exemplary embodiment, the connecting rod and the connecting cap are integrally formed.

In an exemplary embodiment, the connecting member further includes a nut. The nut is threadedly engaged with the connecting rod and arranged between the flexible member and the outer surface of the elongated slot of the heat-dissipating plate.

In an exemplary embodiment, the flexible member and the curved light guide plate define a variable gap therebetween. The flexible member and the curved light guide plate are arranged with a preset gap.

In an exemplary embodiment, the heat-dissipating plate and the supporting plate respectively are formed with heat-dissipating holes.

In an exemplary embodiment, the heat-dissipating plate includes a first side plate, a first bottom plate, a first slant plate, a first contact plate and a bended connect plate successively connected in that order. The light source is arranged on the first side plate. The first side plate, the first bottom plate and the first slant plate cooperatively define a second heat-dissipating cavity.

In an exemplary embodiment, the supporting plate includes a second side plate, a second bottom plate, a second slant plate, a second contact plate and a second bended connect plate successively connected in that order. The curved light guide plate and the second side plate define a gap therebetween for expansion of the curved light guide plate. The second side plate, the second bottom plate and the second slant plate cooperatively define a first heat-dissipating cavity.

In an exemplary embodiment, the curved backlight assembly further includes a heat-dissipating strip. The heat-dissipating strip is arranged between the light source and the first side plate.

In order to solve the above-mentioned problems, the present invention further provides another technical solution. In particular, a curved liquid crystal display device is provided. The curved liquid crystal display device includes a curved backlight assembly and a curved optical film arranged on the curved backlight assembly. The curved backlight assembly includes a light source, a curved light guide plate, a heat-dissipating plate with a preset curvature radius, a supporting plate with a preset curvature radius, and a connecting member. The light source is abutted with the curved light guide plate. The heat-dissipating plate and the supporting plate are connected by the connecting member to thereby form a curved backplane. The curved light guide plate is arranged on the curved backplane. Connected ends of the heat-dissipating plate and the supporting plate are formed with elongated slots. The connecting member penetrates through the elongated slots to connect the heat-dissipating plate and the supporting plate together. A dimension of the curved backplane is increased or decreased with a relative displacement between the heat-dissipating plate and the supporting plate to match with expansion or contraction of the curved light guide plate.

In an exemplary embodiment, the heat-dissipating plate and the supporting plate define a spacing cavity at a connection location thereof. The spacing cavity is for facilitating the connecting member to penetrate through the elongate slots of the heat-dissipating plate and the supporting plate and for heat dissipating of the curved light guide plate.

In an exemplary embodiment, the connecting member includes a connecting rod, a flexible member and a connecting cap. The flexible member is engaged with the connecting rod and arranged at an outer surface of the elongated slot of the heat-dissipating plate facing toward the curved light guide plate. The connecting cap is engaged with the connecting rod and arranged on an outer surface of the elongated slot of the supporting plate facing away from the curved light guide plate.

In an exemplary embodiment, the connecting rod and the connecting cap are integrally formed.

In an exemplary embodiment, the connecting member further includes a nut. The nut is threadedly engaged with the connecting rod and arranged between the flexible member and the outer surface of the elongated slot of the heat-dissipating plate.

In an exemplary embodiment, the flexible member and the curved light guide plate define a variable gap therebetween. The flexible member and the curved light guide plate are arranged with a preset gap.

In an exemplary embodiment, the heat-dissipating plate and the supporting plate respectively are formed with heat-dissipating holes.

In an exemplary embodiment, the heat-dissipating plate includes a first side plate, a first bottom plate, a first slant plate, a first contact plate and a bended connect plate successively connected in that order. The light source is arranged on the first side plate. The first side plate, the first bottom plate and the first slant plate cooperatively define a first heat-dissipating cavity.

In an exemplary embodiment, the supporting plate includes a second side plate, a second bottom plate, a second slant plate, a second contact plate and a second bended connect plate successively connected in that order. The curved light guide plate and the second side plate define a gap therebetween for expansion of the curved light guide plate. The second side plate, the second bottom plate and the second slant plate cooperatively define a second heat-dissipating cavity.

In an exemplary embodiment, the curved backlight assembly further includes a heat-dissipating strip. The heat-dissipating strip is arranged between the light source and the first side plate.

Beneficial effects can be achieved by the present invention are that: the connecting member of the liquid crystal display device and the curved backlight assembly thereof provided by the present invention penetrates through the elongated slots of the heat-dissipating plate with a preset curvature radius and the supporting plate with a preset curvature radius to connect the heat-dissipating plate and the supporting plate together, so that the dimension of the curved backplane can be increased or decreased with the relative displacement between the heat-dissipating plate and the supporting plate to match with expansion or contraction of the curved light guide plate. Therefore, a simple structure is achieved, the optical coupling distance between the light source and the curved light guide plate is shortened and the light incidence efficiency is improved.

BRIEF DESCRIPTION OF THE DRAWINGS

In order to more clearly describe the technical solutions of embodiments of the present invention, drawings used in the description of the embodiments will be given a brief description in the following. Apparently, the drawings described below are only some embodiments of the present invention, those ordinarily skilled in the art can obtain other drawings based on these drawings on the premise of without creative effort. Wherein.

DETAILED DESCRIPTION OF EMBODIMENTS

The technical solutions of embodiments of the present invention will be clearly and fully described below with reference to the drawings of the embodiments of the present invention. Apparently, the described embodiments are merely part of embodiments of the present invention, but not all embodiments. Based on the described embodiments of the present invention, all the other embodiments obtained by those skilled in the art without creative effort are within the scope of protection of the present invention.

Figure 1:
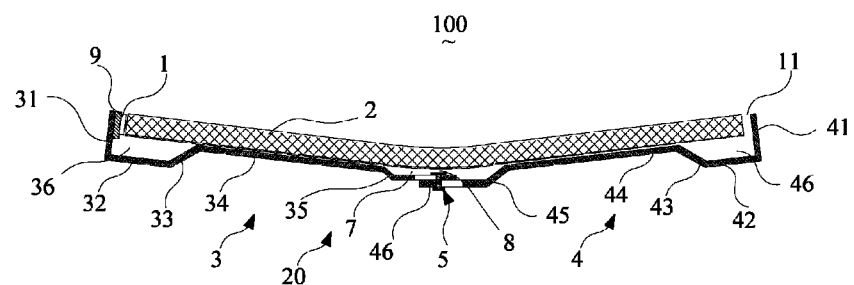
FIG. 1 is a schematic cross-sectional view of a curved backlight assembly when a curved light guide plate thereof is expanded according to an exemplary embodiment of the present invention.
Figure 2:
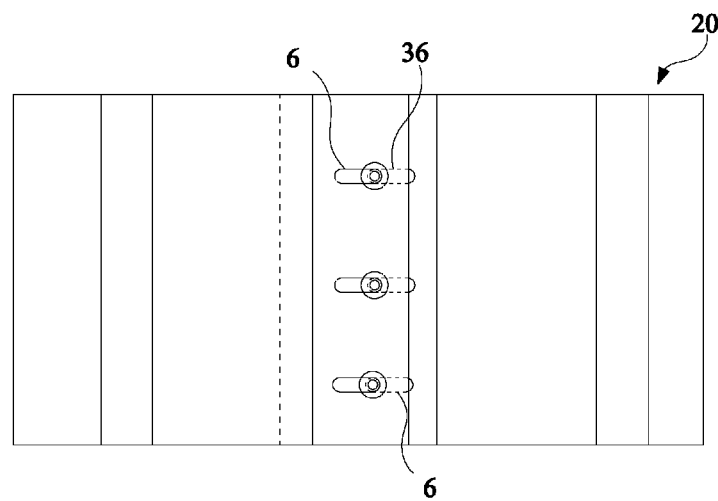
FIG. 2 is a schematic top view of a backplane of the curved backlight assembly in FIG. 1.
Figure 3:
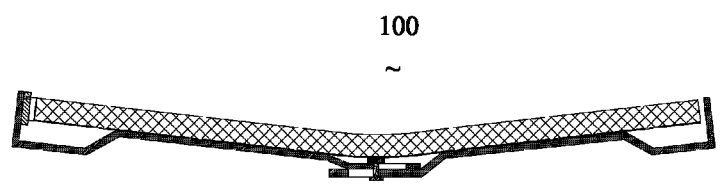
FIG. 3 is a schematic cross-sectional view of a curved backlight assembly when a curved light guide plate thereof is contracted according to the exemplary embodiment of the present invention.

Referring to FIG. 1, which is a schematic cross-sectional view of a curved backlight assembly when a curved light guide plate thereof is expanded according to an exemplary embodiment of the present invention. FIG. 2 is a schematic top view of a backplane of the curved backlight assembly in FIG. 1. FIG. 3 is a schematic cross-sectional view of a curved backlight assembly when the curved light guide plate thereof is contracted according to the exemplary embodiment of the present invention. In the illustrated embodiment, the curved backlight assembly 100 basically includes a light source 1, a curved light guide plate 2, a heat-dissipating plate 3 with a preset curvature radius, a supporting plate 4 with a preset curvature radius, and a connecting member 5.

The heat-dissipating plate 3 and the supporting plate 4 are connected by the connecting member 5 to thereby form a curved backplane 20. The curved light guide plate 2 is arranged on the curved backplane 20. Connected ends of the heat-dissipating plate 3 and the supporting plate 4 respectively are formed with elongated slots 6. The connecting member 5 penetrates through the elongated slots 6 to connect the heat-dissipating plate 3 and the supporting plate 4 together. A dimension of the curved backplane 20 is increased or decreased with a relative displacement between the heat-dissipating plate 3 and the supporting plate 4 to match with expansion or contraction of the curved light guide plate 2. The heat-dissipating plate 3 and the supporting plate 4 cooperatively define a spacing cavity 7 at a connection location thereof. The spacing cavity 7 facilitates the connecting member 5 to penetrate through the elongated slots of the heat-dissipating plate 3 and the supporting plate 4 and facilitates heat dissipation of the curved light guide plate 2.

In the illustrated embodiment, the light source 1 is abutted with a side surface of the curved light guide plate 2.

Alternatively, in other embodiment, in order to prevent a reverse displacement speed of the heat-dissipating plate 3 with respect to the supporting plate 4 lower than a thermal expansion speed of the curved light guide plate 2, the light source 1 is arranged adjacent to the side surface of the curved light guide plate 2 with a certain distance. The distance can be in the range of 0 millimeter (mm) to 8 mm. In order to improve the light incidence efficiency, the distance between the light source 1 and the curved light guide plate 2 preferably is 3 mm.

It is indicated that, in other embodiments, the heat-dissipating plate 3 and the supporting plate 4 each are formed with one heat-dissipating hole or multiple regularly or randomly arranged heat-dissipating holes; the elongated slots 6 on each of the heat-dissipating plate 3 and the supporting plate 4 can be multiple according to the actual need; the elongated slots 6 can be rectangular slots or key slots, but are not limited to these.

The heat-dissipating plate 3 includes a first side plate, a first bottom plate 32, a first slant plate 33, a first contact plate 34 and a first bended connect plate 35 successively connected in that order. The light source 1 is arranged on the first side plate 31. The first side plate 31, the first bottom plate 32 and the first slant plate cooperatively define a first heat-dissipating cavity. The supporting plate 4 includes a second side plate 41, a second bottom plate 42, a second slant plate 43, a second contact plate 44 and a second bended connect plate 45 successively connected in that order. The curved light guide plate 2 and the second side plate define a gap 11 therebetween for expansion of the curved light guide plate 2. The side plate 41, the second bottom plate 42 and the second slant plate 43 cooperatively define a second heat-dissipating cavity 46.

Moreover, the curved backlight assembly 100 in the illustrated embodiment further includes a heat-dissipating strip 9 arranged between the light source 1 and the first side plate 31.

Figure 4:
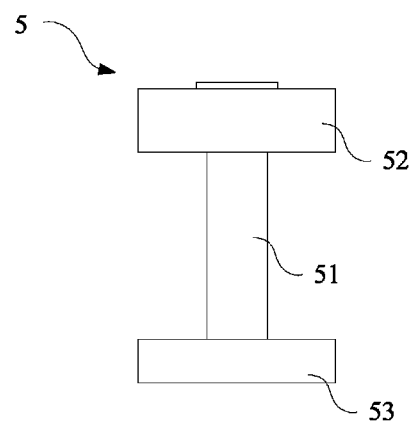
FIG. 4 is a schematic structure view of a connecting member of the curved backlight assembly in FIG. 1.

Referring to FIG. 4, which is a schematic structural view of the connecting member of the curved backlight assembly in FIG. 1. In the illustrated embodiment, the connecting member 5 includes a connecting rod 51, a flexible member 52 and a connecting cap 53.

The flexible member 52 is engaged with the connecting rod 51. The flexible member 52 is arranged at an outer surface 36 of the elongated slot 6 of the heat-dissipating plate 3 facing toward the curved light guide plate 2. The connecting cap 53 is engaged with the connecting rod 51. The connecting cap 53 is arranged at an outer surface 46 of the elongated slot 6 of the supporting plate 4 facing away from the curved light guide plate 2. The flexible member 52 and the curved light guide plate 2 define a variable gap 8 therebetween. The flexible member 52 is disposed with respect to the curved light guide plate 2 with a preset spacing. Specifically, during the curved light guide plate 2 gradually expands when heated, the distance gap 8 between the curved light guide plate 2 and the flexible member 52 gradually is increased. Whereas, during the curved light guide plate 2 contacts when cooled, the distance gap between the curved light guide plate 2 and the flexible member 52 gradually is decreased and even the curved light guide plate 2 is abutted with the flexible member 52, and further, as shown in FIG. 3, the curved light guide plate 2 squeezes the flexible member 52. The flexible member 52 is a soft material or a material with elastic function, such as gasket, nylon, spring, and so on. In order to avoid the curved light guide plate 2 being scratched, the flexible member 52 preferably is a gasket.

Figure 5:
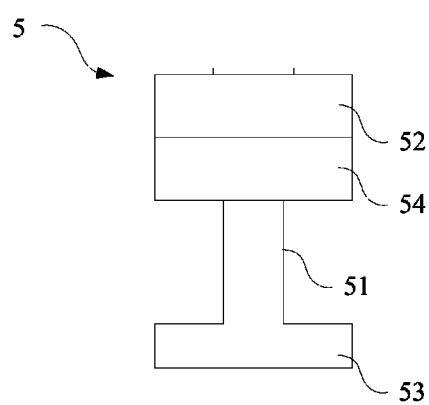
FIG. 5 is a schematic structure view of a connecting member according to another implementation of the curved backlight assembly in FIG. 1.

In other embodiment, the connecting rod 51 and the connecting cap are integrally formed. Furthermore, as shown in FIG. 5, the connecting member 5 further includes a nut 54. The nut 54 is threadedly engaged with the connecting rod 51 and arranged between the flexible member 52 and the outer surface 36 of the elongated slot 6 of the heat-dissipating plate 3. The flexible member 52 can be a gasket, or nylon, and so on. It is understood that, the nut 54 can be replaced by a spring. Only one end of the spring is engagedly connected with the connecting rod 51 and arranged crossing the outer surface 36 of the elongated slot 6, and the other portion suspends in the spacing cavity 7. It is understood that, the connected end of the spring and the outer surface 36 of the elongated slot 6 of the heat-dissipating plate 3 can be added with a gasket therebetween so as to avoid the abrasion of the spring and the outer surface 36 of elongated slot 6.

In the foregoing description, various components and connection relationships thereamong of the curved backlight assembly 100 are briefly described. In the following, changing processes of the various components during expansion and contraction of the curved backlight assembly according to practical application will be described in detail.

In a normal state, the elongated slot 6 of the heat-dissipating plate 3 with a preset curvature radius and the elongated slot 6 of the supporting plate 4 with a preset curvature radius are coincided, and the connecting member 5 is located at the middle of the elongated slots 6.

When the curved backlight assembly 100 starts to work, the curved light guide plate 2 receive light rays of the light source 1 incident on the light guide plate 2 and thereby a heat is generated. The curved light guide plate 2 gradually expands with the increase of the heat, and the radius of the curved light guide plate 2 gradually is increased correspondingly. The curved backplane 20 is effected by an expansion tensile force of the curved light guide plate 2 and a dimension of the curved backplane 20 is increased with the increase of dimension of the curved light guide plate 2. In particular, the heat-dissipating plate 3 and the supporting plate 4 individually contacted with the curved light guide plate 2 are displaced along two opposite directions. More specifically, the elongated slot 6 of the heat-dissipating plate 3 and the elongated slot 6 of the supporting plate 4 occur dislocation and displacement toward the right direction along their long axes from the state of coincided with each other, i.e., the connecting member 5 in the elongated slot 6 is gradually close to the rightmost end of the elongated slot 6 of the heat-dissipating plate 3 from the middle location. Meanwhile, the gap between the flexible member 52 and the curved light guide plate 2 is gradually increased until the curved light guide plate expands to its ultimate value, and then connecting member 5 reaches to the rightmost end of the elongated slot 6 of the heat-dissipating plate 3.

When the curved backlight assembly 100 stops working, since without the incident of light rays of the light source 1, the curved light guide plate 2 gradually reach to a constant temperature, the curved light guide plate 2 gradually contacts with the decrease of heat, the dimension of the curved light guide plate 2 gradually is decreased, the curved backplane 20 is effected by a contraction pulling force of the curved light guide plate 2 and the dimension of the curved backplane 20 is decreased with the decrease of dimension of the curved light guide plate 2. In particular, the heat-dissipating plate 3 and the supporting plate 4 individually contacted with the curved light guide plate 2 are displaced along face-to-face directions. More specifically, the elongated slot 6 of the heat-dissipating plate 3 and the elongated slot 6 of the supporting plate 4 retrieve to the coincided state from the dislocation state along their long axes, i.e., the connecting member 5 in the elongated slot 6 is gradually close to the middle of the elongated slot 6 of the heat-dissipating plate 3 from the rightmost end. Meanwhile, the gap between the flexible member 52 and the curved light guide plate 2 is gradually decreased.

Further, when the curved light guide plate 2 continues to contract, the elongated slot 6 of the heat-dissipating plate 3 and the elongated slot 6 of the supporting plate 4 occur a back to back dislocation along their long axes from the coincided state, i.e., the connecting member 5 in the elongated slot 6 of the heat-dissipating plate 3 is gradually close to the leftmost end from the middle location. When the curved light guide plate 2 contracts to an extreme value, the connecting member 5 in the elongated slot 6 of the heat-dissipating plate 3 reaches to the leftmost end of the elongated slot 6 of the heat-dissipating plate 3. Meanwhile, the flexible member 52 and the curved light guide plate 2 have a minimum gap formed therebetween, i.e., the curved light guide plate 2 is abutted with the flexible member 52.

It is understood that, when the curved backlight assembly 100 works in practical applications, it may expand caused by heat generated from other components, or may expand or contact under the effect of external factors.

In another aspect, the present invention also provides a liquid crystal display device. The liquid crystal display device includes the above-described curved backlight assembly 100 and a curved optical film (not shown) arranged on the curved backlight assembly 100.

In summary, the connecting member 5 of the liquid crystal display device and the curved backlight assembly 100 thereof according to the present invention penetrates through the elongated slots 6 of the heat-dissipating plate 4 with a preset curvature radius and the supporting plate 4 with a preset curvature radius to thereby connect the heat-dissipating plate 3 and the supporting plate 4 together, so that the dimension of the curved backplane 20 can be increased or decreased with the relative displacement between the heat-dissipating plate 3 and the supporting plate 4 to match with expansion or contraction of the curved light guide plate 2. Therefore, a simple structure can be achieved, the optical coupling distance between the light source and the curved light guide plate can be shortened, and the light incidence efficiency is improved.

It is noted that, the terminologies of "first" and "second", etc. mentioned in the above embodiments of the present invention only are word distinguishing symbols according to needs, and in practice are not limited to these, and the word symbols can be interchanged.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A curved backlight assembly comprising: a light source, a curved light guide plate, a heat-dissipating plate with a preset curvature radius, a supporting plate with a preset curvature radius, and a connecting member; wherein
    the light source is abutted with the curved light guide plate;
    the heat-dissipating plate and the supporting plate are connected by the connecting member to thereby form a curved backplane, and the curved light guide plate is arranged on the curved backplane;
    connected ends of the heat-dissipating plate and the supporting plate respectively are formed with elongated slots, the connecting member penetrates through the elongated slots to connect the heat-dissipating plate and the supporting plate together, a dimension of the curved backplane is increased or decreased with a relative displacement between the heat-dissipating plate and the supporting plate to match with expansion or contraction of the curved light guide plate;
    wherein the connecting member comprises:
        a connecting rod;
        a flexible member, engaged with the connecting member and arranged at an outer surface of the elongated slot of the heat-dissipating plate facing toward the curved light guide plate;
        a connecting cap, engaged with the connecting rod and arranged at an outer surface of the elongated slot of the supporting plate facing away from the curved light guide plate; and
        a nut, threadedly engaged with the connecting rod and arranged between the flexible member and the outer surface of the elongated slot of the heat-dissipating plate.

2. The curved backlight assembly as claimed in claim 1, wherein the heat-dissipating plate and the supporting plate define a spacing cavity at a connection location thereof, the spacing cavity is for facilitating the connecting member to penetrate through the elongated slots of the heat-dissipating plate and the supporting plate and for heat dissipation of the curved light guide plate.

3. The curved backlight assembly as claimed in claim 1, wherein the connecting rod and the connecting cap are integrally formed.

4. The curved backlight assembly as claimed in claim 1, wherein the flexible member and the curved light guide plate define a variable gap therebetween.

5. The curved backlight assembly as claimed in claim 4, wherein heat-dissipating plate and the supporting plate respectively are formed with heat-dissipating holes.

6. The curved backlight assembly as claimed in claim 5, wherein the heat-dissipating plate comprises a first side plate, a first bottom plate, a first slant plate, a first contact plate and a first bended connect plate successively connected in that order; the light source is arranged on the first side plate; and the first side plate, the first bottom plate and the first slant plate define a first heat-dissipating cavity.

7. The curved backlight assembly as claimed in claim 6, wherein the supporting plate comprises a second side plate, a second bottom plate, a second slant plate, a second contact plate and a second bended connect plate successively connected in that order; the curved light guide plate and the second side plate define a gap therebetween for expansion of the curved light guide plate; and the second side plate, the second bottom plate and the second slant plate define a second heat-dissipating cavity.

8. The curved backlight assembly as claimed in claim 7, wherein the curved backlight assembly further comprises a heat-dissipating strip arranged between the light source and the first side plate.

9. A curved liquid crystal display device comprising a curved backlight assembly and a curved optical film arranged on the curved backlight assembly; wherein the curved backlight assembly comprises a light source, a curved light guide plate, a heat-dissipating plate with a preset curvature radius, a supporting plate with a preset curvature radius, and a connecting member;

the light source is abutted with the curved light guide plate;

the heat-dissipating plate and the supporting plate are connected by the connecting member to thereby form a curved backplane, and the curved light guide plate is arranged on the curved backplane;

connected ends of the heat-dissipating plate and the supporting plate respectively are formed with elongated slots, the connecting member penetrates through the elongated slots to connect the heat-dissipating plate and the supporting plate together, a dimension of the curved backplane is increased or decreased with a relative displacement between the heat-dissipating plate and the supporting plate to match with expansion or contraction of the curved light guide plate;

wherein the connecting member comprises:
a connecting rod;
a flexible member, engaged with the connecting member and arranged at an outer surface of the elongated slot of the heat-dissipating plate facing toward the curved light guide plate;
a connecting cap, engaged with the connecting rod and arranged at an outer surface of the elongated slot of the supporting plate facing away from the curved light guide plate; and
a nut, threadedly engaged with the connecting rod and arranged between the flexible member and the outer surface of the elongated slot of the heat-dissipating plate.

10. The curved liquid crystal display device as claimed in claim 9, wherein the heat-dissipating plate and the supporting plate define a spacing cavity at a connection location thereof, the spacing cavity is for facilitating the connecting member to penetrate through the elongated slots of the heat-dissipating plate and the supporting plate and for heat dissipation of the curved light guide plate.

11. The curved liquid crystal display device as claimed in claim 9, wherein the connecting rod and the connecting cap are integrally formed.

12. The curved liquid crystal display device as claimed in claim 9, wherein the flexible member and the curved light guide plate define a variable gap therebetween.

13. The curved liquid crystal display device as claimed in claim 12, wherein heat-dissipating plate and the supporting plate respectively are formed with heat-dissipating holes.

14. The curved liquid crystal display device as claimed in claim 13, wherein the heat-dissipating plate comprises a first side plate, a first bottom plate, a first slant plate, a first contact plate and a first bended connect plate successively connected in that order; the light source is arranged on the first side plate; and the first side plate, the first bottom plate and the first slant plate define a first heat-dissipating cavity.

15. The curved liquid crystal display device as claimed in claim 14, wherein the supporting plate comprises a second side plate, a second bottom plate, a second slant plate, a second contact plate and a second bended connect plate successively connected in that order; the curved light guide plate and the second side plate define a gap therebetween for expansion of the curved light guide plate; and the second side plate, the second bottom plate and the second slant plate define a second heat-dissipating cavity.

16. The curved liquid crystal display device as claimed in claim 15, wherein the curved backlight assembly further comprises a heat-dissipating strip arranged between the light source and the first side plate.

* * * * *